Aug. 14, 1923.

B. A. HARRIS

DAIRYING APPLIANCE

Filed Dec. 4, 1922

1,464,677

INVENTOR.
Bertha A. Harris
BY
ATTORNEY

Patented Aug. 14, 1923.

1,464,677

UNITED STATES PATENT OFFICE.

BERTHA A. HARRIS, OF DENAIR, CALIFORNIA.

DAIRYING APPLIANCE.

Application filed December 4, 1922. Serial No. 604,735.

*To all whom it may concern:*

Be it know that I, BERTHA A. HARRIS, a citizen of the United States, residing at Denair, county of Stanislaus, State of California, have invented certain new and useful Improvements in Dairying Appliances; and I do declare the following to be a full, clear, and exact description of the same, reference being had to the accompanying drawings, and to the characters of reference marked thereon, which form a part of this application.

This invention relates to improvements in appliances for use in connection with hand milking operations, the principal object being to provide a little device to be removably applied to a cow's tail prior to milking, which will prevent the cow from swinging her tail sideways, which oft-times results in the milker being struck in the face or eyes, to the detriment of his milking operations and conducive to the loss of temper, besides being apt to result in momentary blindness or possible damage to the eyes.

Since the tail, when so allowed to swing may also at times overhang and enter the necessarily open milk pail, the possibility of the milk being thus contaminated and soiled is eliminated with the use of my appliance.

At the same time, no harm is done to the cow, nor does she experience any discomfort having freedom of movement of her tail in all respects except as to the above named extent or kind of movement.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
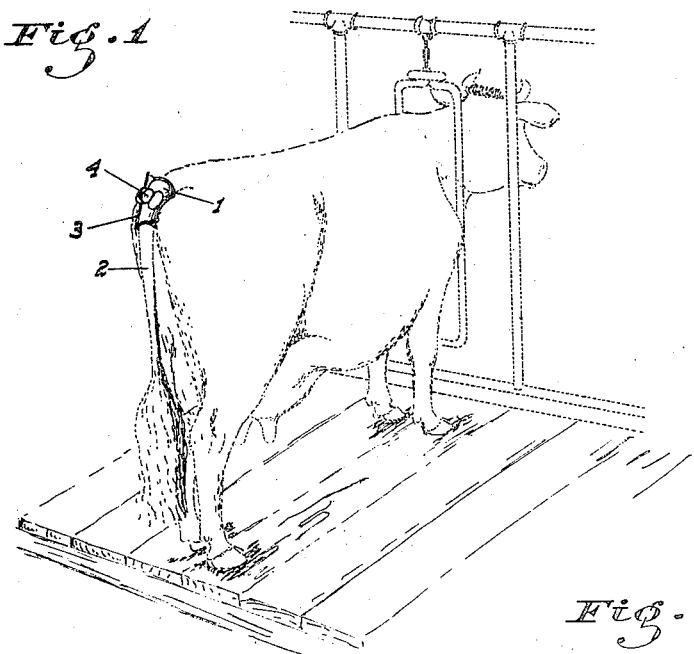
Fig. 1 is a perspective outline of a cow, showing my device as applied to her tail.
Figure 2:
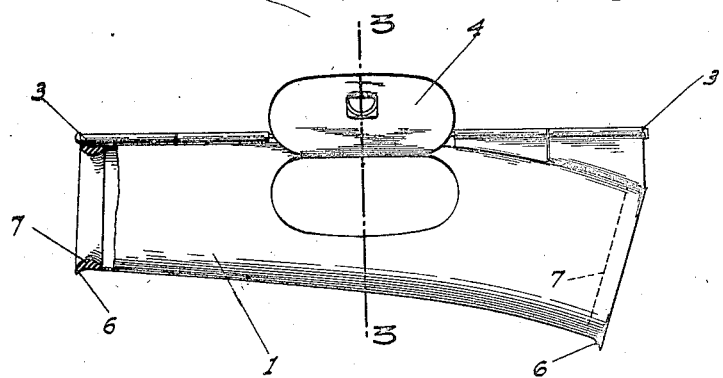
Fig. 2 is a longitudinal elevation of the device.
Figure 3:
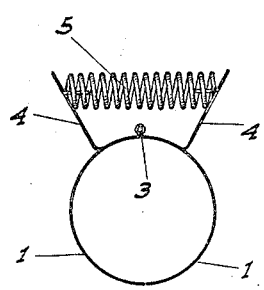
Fig. 3 is a cross section on the line 3—3 of Fig. 2.

Referring now more particularly to the characters of reference on the drawings, the numeral 1 denotes a pair of opposed semicircular members, enclosing an area whose cross section is about that of the average cow's tail 2 adjacent the upper end thereof.

Since said tail tapers down from its upper end, the members 1 taper from one end to the other so as to outline an area smaller at one end than at the other. Said members are also preferably curved longitudinally for a certain portion so as to conform to a certain extent to the normal curvature of the tail at that portion thereof on which the device is to be applied.

The members 1 are hinged together along one edge as at 3 to allow opening and closing movement along the opposite edge, handles or grips 4 being provided with said members at any suitable point in their length to enable the same to be opened at will, suitable spring means 5 being included to normally cause said members 1 to be closed.

The members 1 are made of some light yet rigid and noncorrosive material, such as sheet tin galvanized, and the grips and hinges, for cheapness and ease of manufacture, are preferably integral therewith.

The ends of the members 1 flare outwardly somewhat as shown at 6, so as to eliminate any sharp edges which might hurt or irritate the cow, and such ends, particularly at the lower or small end, are lined with rubber strips 7, which not only keep the device from slipping, but also provide a firm yet cushion-like grip on the tail in a manner not to hurt the tail, as the device must, to be fully effective, fit snugly about the tail, especially at the lower or small end.

This lining may of course cover the entire interior of the device, but I hardly think this necessary.

In placing the device, the handles are manipulated to spread the member 1 apart, and the device is then lowered to surround the tail at the proper point.

This must be adjacent the upper end where the first muscle or joint is located, and the latter must lie intermediate the ends of the device, since it is only at this point that the cow can swing her tail sideways so as to strike the milker. At the same time, the cow still has full use of the lower part of her tail, which may move without annoyance or harm to the milker.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An appliance for the purpose set forth comprising a tubular structure adapted to surround the tail of a cow adjacent the upper end, the upper portion of said structure being longitudinally curved to conform to the curvature of the tail at that end, whereby the appliance will maintain its position on the tail without frictionally gripping the same.

2. An appliance for the purpose set forth comprising a tubular structure adapted to surround the tail of a cow adjacent the upper end, said structure being tapered from end to end to conform to the taper of that portion of the tail and being curved longitudinally to substantially conform to the natural curvature of the tail at said end.

In testimony whereof I affix my signature.

Mrs. BERTHA A. HARRIS.